United States Patent
Kim et al.

(10) Patent No.: US 12,510,990 B2
(45) Date of Patent: Dec. 30, 2025

(54) DISPLAY APPARATUS

(71) Applicant: LG Display Co., Ltd., Seoul (KR)

(72) Inventors: Seunghyun Kim, Goyang-si (KR); Neunghee Lee, Seoul (KR); DongHyun Park, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/740,254

(22) Filed: Jun. 11, 2024

(65) Prior Publication Data

US 2024/0329770 A1    Oct. 3, 2024

Related U.S. Application Data

(63) Continuation of application No. 17/990,531, filed on Nov. 18, 2022, now Pat. No. 12,032,777.

(30) Foreign Application Priority Data

Dec. 31, 2021   (KR) .................. 10-2021-0194264

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04112* (2013.01)

(58) Field of Classification Search
CPC ....... G06F 3/04164; G06F 2203/04112; G06F 3/0446
See application file for complete search history.

(56) References Cited

U.S. PATENT DOCUMENTS

| | | | |
|---|---|---|---|
| 11,042,252 B2 | 6/2021 | Jeong et al. | |
| 2012/0092273 A1* | 4/2012 | Lyon | G06F 3/04164 345/173 |
| 2020/0027929 A1 | 1/2020 | Lee et al. | |
| 2020/0301544 A1 | 9/2020 | Jeong et al. | |
| 2022/0035486 A1* | 2/2022 | Kim | G06F 3/0443 |

FOREIGN PATENT DOCUMENTS

| KR | 10-2020-0113090 A | 10/2020 |
|---|---|---|
| KR | 10-2021-0034203 A | 3/2021 |

OTHER PUBLICATIONS

United States Office Action, U.S. Appl. No. 17/990,531, Nov. 15, 2023, 12 pages.
United States Office Action, U.S. Appl. No. 17/990,531, Aug. 3, 2023, 11 pages.
Korean Intellectual Property Office, Office Action, Korean Patent Application No. 10-2021-0194264, Oct. 15, 2025, nine pages.

* cited by examiner

*Primary Examiner* — Deeprose Subedi
(74) *Attorney, Agent, or Firm* — Fenwick & West LLP

(57) ABSTRACT

A display apparatus includes a display panel including a display area and a non-display area at least partially surrounding the display area; a touch electrode on the display panel and including an electrode metal having a mesh shape; and a plurality of touch routing lines at an outside of the touch electrode and electrically connected to the touch electrode, and the touch electrode is in the display area and a part of the non-display area, and a width of the electrode metal of the touch electrode in the non-display area is different from a width of the electrode metal of the touch electrode in the display area.

23 Claims, 9 Drawing Sheets

DISPLAY APPARATUS

CROSS-REFERENCE TO RELATED APPLICATION

This application is a continuation of U.S. patent application Ser. No. 17/990,531 filed on Nov. 18, 2022, which claims the priority of Republic of Korea Patent Application No. 10-2021-0194264 filed on Dec. 31, 2021, in the Korean Intellectual Property Office, each of which is hereby incorporated by reference in its entirety.

BACKGROUND

Field

The present disclosure relates to a display apparatus.

Description of the Related Art

As the information society develops, demands for display apparatuses which display images is increasing and various types of display apparatuses such as a liquid crystal display apparatus or an organic light emitting display apparatus are utilized.

In order to provide different functions to users, the display apparatus provides a function of recognizing a touch on a display panel of a user and performing input processing based on the recognized touch.

For example, a display apparatus which is capable of recognizing a touch includes a plurality of touch electrodes which is disposed or embedded in the display panel and drives the touch electrode to detect the presence of the touch of the user for the display panel or a touch coordinate.

In recent years, a demand for a high performance of a touch function of the display panel is further increased so that a design for increasing an efficiency of the touch electrode is being employed. In accordance with the design requirement, touch electrodes having the same shape may be disposed on the display panel with the same interval to detect a touch of the same touch characteristic (or function). By doing this, there is a problem in that the touch performance of the touch area at the outer periphery of the display area of the display panel is non-uniform.

SUMMARY

A display apparatus according to an embodiment of the present disclosure provides a structure which improves a sensing performance of a touch electrode in a touch area at the outer periphery of the display area of the display panel.

According to an aspect of the present disclosure, a display apparatus includes a display panel including a display area and a non-display area surrounding the display area; a touch electrode on the display panel and including an electrode metal having a mesh shape; and a plurality of touch routing lines disposed at the outside of the touch electrode and electrically connected to the touch electrode, and the touch electrode is disposed in the display area and a part of the non-display area, and a width of the electrode metal of the touch electrode disposed in the non-display area is different from a width of the electrode metal of the touch electrode disposed in the display area.

According to another aspect of the present disclosure, a display apparatus includes a display panel including a display area having a rounded square shape and a non-display area surrounding the display area; a touch electrode on the display panel and including an electrode metal having a mesh shape; and a plurality of touch routing lines disposed at the outside of the touch electrode and electrically connected to the touch electrode, and the touch electrode is disposed in the display area and a part of the non-display area, and a width of the outermost touch routing line among the plurality of touch routing lines, is different from widths of the remaining of the plurality of touch routing lines.

According to an embodiment of the present disclosure, widths of an electrode metal of the touch electrode and a touch routing line in the touch area at the outer periphery of the display area of the display panel are extended to improve the touch sensing performance.

According to the embodiment of the present disclosure, the touch sensing performance of the touch electrode at the outer periphery of the display area of the display panel is improved without having an additional component so that a degree of freedom of design of a shape of the outside of the display area may be ensured.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

Figure 1:
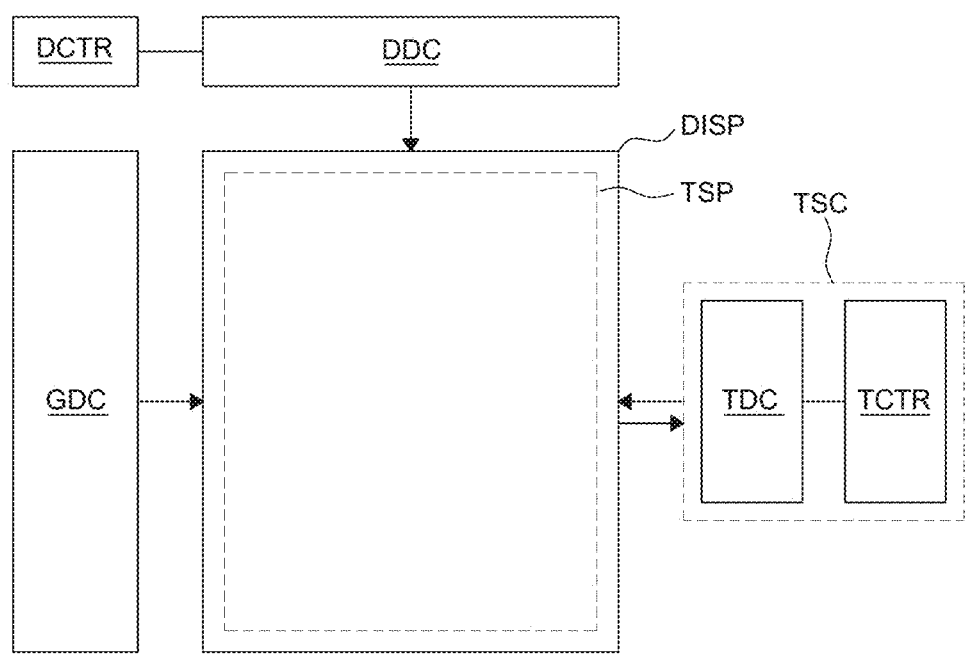
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Advantages and characteristics of the present disclosure and a method of achieving the advantages and characteristics will be clear by referring to embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the relation of a time sequential order is described using the terms such as "after", "continuously to", "next to", and "before", the order may not be continuous unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The features of various embodiments of the present disclosure can be partially or entirely adhered to or combined with each other and can be interlocked and operated in technically various ways, and the embodiments can be carried out independently of or in association with each other.

In the present specification, a "display apparatus" may include a display apparatus which includes a display panel and a driver for driving the display panel, in a narrow sense, such as a liquid crystal module (LCM), an organic light emitting module (OLED module), and a quantum dot (QD) module. Further, the "display apparatus" may further include a set electronic apparatus or a set apparatus (or a set device) which is a complete product or a final product including a LCM, an OLED module, or a QD module, such as a notebook computer, a television, or a computer monitor, an automotive display apparatus or equipment display apparatus including another type of vehicle and a mobile electronic device including a smart phone or an electronic pad.

Accordingly, the display apparatus of the present disclosure may include not only a display apparatus itself in a narrow sense such as an LCM, an OLED module, or a QD module, but also an applied product or a set apparatus which is a final consumer device including the LCD, the OLED module, or the QD module.

Further, if necessary, the LCM, the OLED module, or the QD module which is configured by a display panel and a driver is represented as a "display apparatus" in a narrow sense and an electronic device as a complete product including the LCM, the OLED module, or the QD module may be represented as a "set apparatus". For example, the display apparatus in the narrow sense includes a liquid crystal (LCD) display panel, an OLED display panel, or a quantum dot display panel and a source PCB which is a controller for driving the display panel. In contrast, the set device may be a concept further including a set PCB which is a set controller which is electrically connected to the source PCB to control the entire set device.

A display panel used in the present embodiment may use any type of display panel such as a liquid crystal display panel, an organic light emitting diode (OLED) display panel, a quantum dot (QD) display panel, and an electroluminescent display panel. But, the display panel is not limited to a specific display panel which is capable of bending a bezel, with a flexible substrate for the OLED display panel of the present disclosure and a lower back-plate support structure. Further, it is not limited to a shape or a size of the display panel used for the display apparatus according to the embodiment of the present disclosure.

For example, when the display panel is an OLED display panel, the display panel includes a plurality of gate lines and a plurality of data lines, and pixels formed at the intersections of the gate lines and the data lines. Further, the display panel may be configured to include an array including a thin film transistor which is an element to selectively apply a voltage to each pixel, an organic light emitting diode (OLED) layer on the array, and an encapsulation substrate or an encapsulation layer disposed on the array so as to cover the organic light emitting diode layer. The encapsulation layer protects the thin film transistor and the organic light emitting diode layer from external impacts and suppresses the permeation of moisture or oxygen into the organic light emitting diode layer. Further, a layer formed on the array may include an inorganic light emitting layer, for example, a nano-sized material layer or quantum dots.

Hereinafter, various configurations of the display apparatus which improves a touch sensing performance by extending widths of an electrode metal of the touch electrode and the touch routing line in the touch area at the outer periphery of the display area of the display panel and ensures a degree of freedom of a design of the shape of the outside of the display area will be described in detail.

FIG. 1 illustrates a display apparatus according to an embodiment of the present disclosure.

With reference to FIG. 1, the display apparatus according to the embodiment of the present disclosure provides both a function for image display and a function for touch sensing.

In order to provide an image display function, a display apparatus according to an embodiment of the present disclosure includes a display panel DISP, a data driving circuit DDC, a gate driving circuit GDC, and a display controller DCTR. In the display panel, a plurality of data lines and a plurality of gate lines are disposed and a plurality of sub pixels defined by the plurality of data lines and the plurality of gate lines is disposed. The data driving circuit DDC drives the plurality of data lines, the gate driving circuit GDC drives the plurality of gate lines, and the display controller DCTR controls operations of the data driving circuit DDC and the gate driving circuit GDC.

Each of the data driving circuit DDC, the gate driving circuit GDC, and the display controller DCTR may be implemented by one or more individual components. In some cases, two or more of the data driving circuit DDC, the gate driving circuit GDC, and the display controller DCTR may be implemented to be combined as one component. For example, the data driving circuit DDC and the display controller DCTR may be implemented as one integrated chip (IC chip).

In order to provide a touch sensing function, the display apparatus according to the embodiment of the present disclosure may include a touch panel TSP and a touch sensing circuit TSC. The touch panel TSP includes a plurality of touch electrodes. The touch sensing circuit TSC supplies a touch driving signal TDS to the touch panel TSP and detects a touch sensing signal from the touch panel TSP to sense the presence of a touch of a user or a touch position (touch coordinate) in the touch panel TSP based on the detected touch sensing signal.

The touch sensing circuit TSC may include a touch driving circuit TDC and a touch controller TCTR. The touch driving circuit TDC supplies a touch driving signal to the touch panel TSP and detects a touch sensing signal TDS from the touch panel TSP. The touch controller TCTR senses the presence of a touch of a user and/or a touch position in the touch panel TSP based on the touch sensing signal detected by the touch driving circuit TDC.

The touch driving circuit TDC may include a first circuit unit which supplies the touch driving signal TDS to the touch panel TSP and a second circuit unit which detects the touch sensing signal from the touch panel TSP.

The touch driving circuit TDC and the touch controller TCTR may be implemented by separate components or in some cases, may be implemented to be combined as one component.

Each of the data driving circuit DDC, the gate driving circuit GDC, and the touch driving circuit TDC may be implemented by one or more integrated circuits. From the viewpoint of electrical connection with the display panel DISP, the circuits may be implemented by a chip on glass (COG) type, a chip on film (COF) type, or a tape carrier package (TCP) type. Further, the gate driving circuit GDC may also be implemented by a gate in panel (GIP) type.

Each of circuit configurations DDC, GDC, and DCTR for display driving and circuit configurations TDC and TCTR for touch sensing may be implemented by one or more individual components. In some cases, one or more of circuit configurations DDC, GDC, and DCTR for display driving and one or more of circuit configurations TDC and TCTR for touch sensing are functionally integrated to be implemented by one or more components.

For example, the data driving circuit DDC and the touch driving circuit TDC may be implemented to be integrated in one or two or more integrated circuit chips. When the data driving circuit DDC and the touch driving circuit TDC are implemented to be integrated in two or more integrated circuit chips, each of two or more integrated circuit chips may have a data driving function and a touch driving function.

The display apparatus according to the embodiment of the present disclosure may be an organic light emitting display apparatus and a liquid crystal display apparatus. For example, even though the display panel DISP may be various types such as an organic light emitting display panel or a liquid crystal display panel, in the following description, hereinafter, it will be described that the display panel is an organic light emitting display panel as an example.

As it will be described below, the touch panel TSP may include a plurality of touch electrodes which is applied with a touch driving signal TDS or detects a touch sensing signal therefrom and a plurality of touch routing lines which connects the plurality of touch electrodes to the touch driving circuit TDC.

The touch panel TSP may be disposed at the outside of the display panel DISP. For example, the touch panel TSP and the display panel DISP may be separately manufactured to be coupled or connected. Such a touch panel TSP is called an external type or an add-on type, but is not limited to this terminology.

As another example, the touch panel TSP may be embedded in the display panel DISP. For example, when the display panel DISP is manufactured, a touch sensor structure such as a plurality of touch electrodes and a plurality of touch routing lines which configure a touch panel TSP may be formed together with electrodes and signal lines for driving the display. Such a touch panel TSP is called an embedded type, but is not limited to this terminology. In the following description, it will be described that the touch panel TSP is an embedded type as an example.

Figure 2:
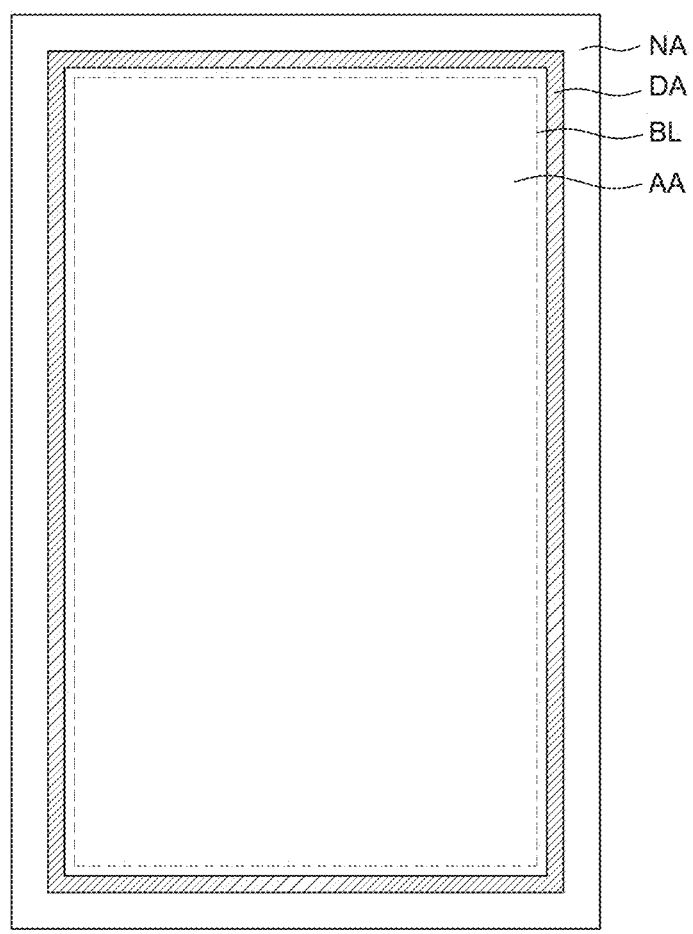
FIG. 2 illustrates a display panel of a display apparatus according to an embodiment of the present disclosure.

FIG. 2 illustrates a display panel of a display apparatus according to an embodiment of the present disclosure.

With reference to FIG. 2, the display panel DISP includes an active area AA (or a display area) in which images are displayed and a non-active area NA (or a non-display area) which is an outer area of an outer boundary line BL of the active area AA. The active area AA may be a display area or a screen portion and the non-active area NA may be a non-display area or a bezel portion, but they are not limited to the terminologies.

In the active area (or the display area) AA of the display panel DISP, a plurality of sub pixels for displaying images is disposed and various electrodes or signal lines for driving the display are disposed.

In the active area AA of the display panel DISP, a plurality of touch electrodes for touch sensing and a plurality of touch routing lines electrically connected thereto may be disposed. Accordingly, the active area AA may also be referred to as a touch sensing area which is capable of sensing the touch.

In the non-active area NA of the display panel DISP, link lines extending from various signal lines disposed in the active area AA or link lines which are electrically connected to various signal lines disposed in the active area AA, and pads which are electrically connected to the link lines may be disposed. The pads disposed in the non-active area NA may be bonded (adhered) or electrically connected with display driving circuits DDC or GDC.

In the non-display area NA of the display panel DISP, link lines extending from a plurality of touch routing lines disposed in the display area AA or link lines which are electrically connected to a plurality of touch routing lines disposed in the display area AA, and pads which are electrically connected to the link lines may be disposed. The pads disposed in the non-active area NA may be bonded (or adhered) or electrically connected with touch driving circuits TDC.

In the non-active area NA, a part of an outermost touch electrode among a plurality of touch electrodes disposed in the active area AA extends or one or more electrodes (touch electrodes) formed of the same material as the plurality of touch electrodes disposed in the active area AA may be further disposed.

For example, all the plurality of touch electrodes disposed in the display panel DISP may be disposed in the active area AA or some (for example, an outermost touch electrode) among the plurality of touch electrodes disposed in the display panel DISP may be disposed in the non-active area NA. Some (for example, an outermost touch electrode) among the plurality of touch electrodes disposed in the display panel DISP may be disposed in both the active area AA and the non-active area NA.

With reference to FIG. 2, the display panel DISP of the display apparatus according to the embodiment of the present disclosure may include a dam area DA. In the dam area DA, a dam DAM is disposed to suppress collapse of any layer (for example, an encapsulation unit in the organic light emitting display panel) in the active area AA.

The dam area DA may be located at a boundary of the active area AA and the non-active area NA or at any one position of a non-active area NA which is an outer area of the active area AA. However, the number of dams does not limit the contents of the present specification.

The dam disposed in the dam area DA may be disposed to surround all directions of the active area AA or disposed only at an outside of one or two or more parts (a part having a layer which may easily collapse) of the active area AA.

The dam disposed in the dam area DA may have one pattern in which all the dams are connected or two or more separated patterns. Further, in the dam area DA, only a first dam may be disposed or two or more dams (for example, a first dam and a second dam) may be disposed, or three or more dams may be disposed.

In the dam area DA, in any one direction, only the first dam is disposed and in the other direction, both the first dam and the second dam may be disposed.

Figure 3:
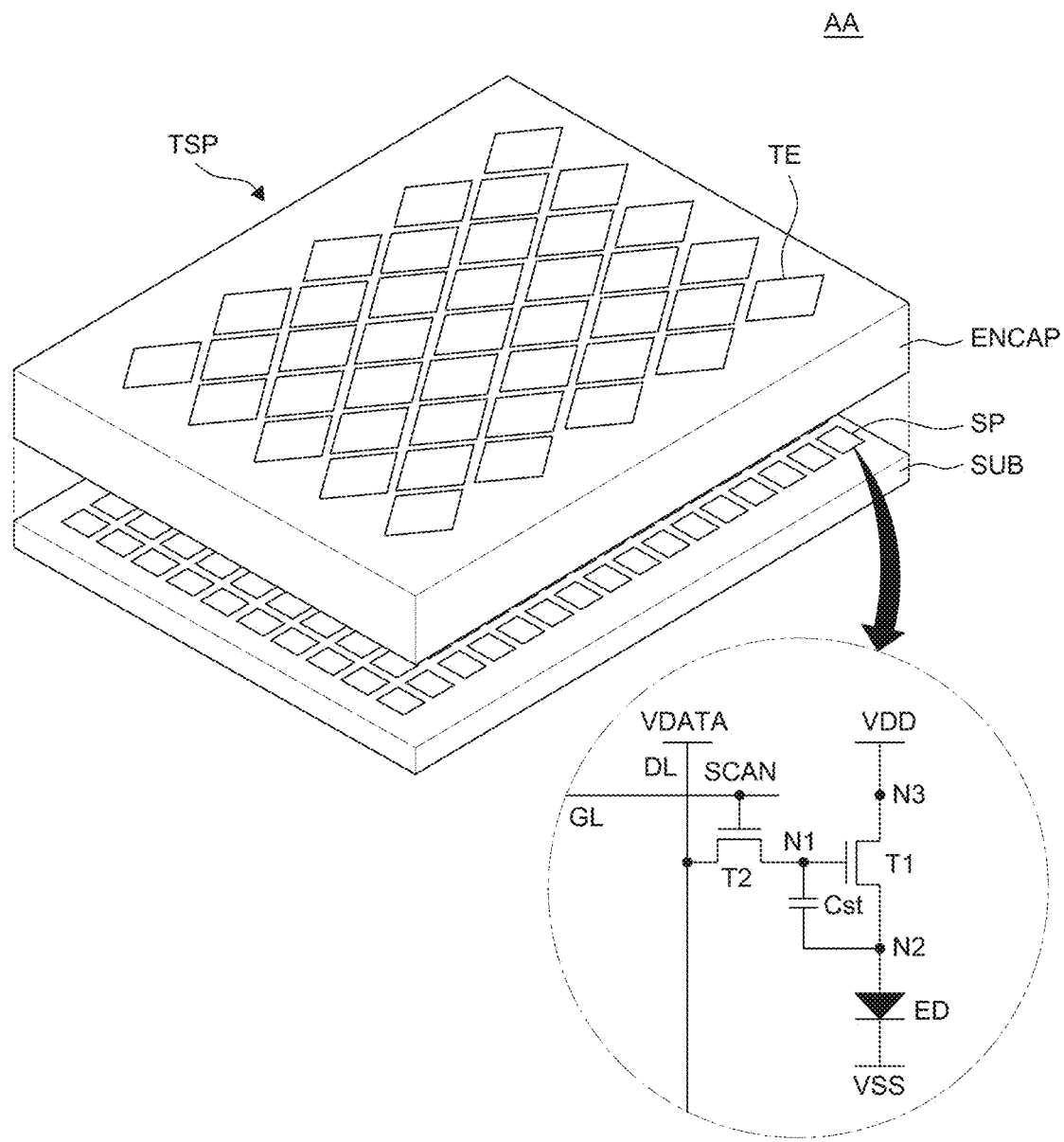
FIG. 3 illustrates a structure in which a touch panel is embedded in a display panel according to an embodiment of the present disclosure.

FIG. 3 illustrates a structure in which a touch panel is embedded in a display panel according to embodiments of the present disclosure.

With reference to FIG. 3, in the active area AA of the display panel DISP, a plurality of sub pixels SP are disposed on a substrate SUB.

Each sub pixel SP may include a light emitting diode ED, a first transistor T1 for driving the light emitting diode ED, a second transistor T2 for transmitting a data voltage VDATA to a first node N1 of the first transistor T1, and a storage capacitor Cst for maintaining a constant voltage for one frame.

The first transistor T1 may include a first node N1 to which the data voltage VDATA is applied, a second node N2 which is electrically connected to the light emitting diode ED, and a third node N3 to which a driving voltage VDD is applied from a driving voltage line DVL. The first node N1 is a gate node, the second node N2 is a source node or a drain node, and the third node N3 is a drain node or a source node, but is not limited to the terminologies. The first transistor T1 may be a driving transistor which drives a light emitting diode ED, but is not limited thereto.

The light emitting diode ED may include a first electrode (for example, an anode electrode), an emission layer, and a second electrode (for example, a cathode electrode). The first electrode is electrically connected to the second node N2 of the first transistor T1 and the second electrode may be applied with a base voltage VSS.

The emission layer in such a light emitting diode ED may be an organic emission layer including an organic material. For example, the light emitting diode ED may be an organic light emitting diode (OLED).

The second transistor T2 is controlled to be turned on or off by a scan signal SCAN applied through the gate line GL and is electrically connected between the first node N1 of the first transistor T1 and the data line DL. The second transistor T2 may be a switching transistor, but is not limited to the terminology.

When the second transistor T2 is turned on by the scan signal SCAN, the second transistor T2 transmits the data voltage VDATA supplied from the data line DL to the first node N1 of the first transistor T1.

The storage capacitor Cst may be electrically connected between the first node N1 and the second node N2 of the first transistor T1.

As illustrated in FIG. 3, each sub pixel SP may have a 2T1C structure including two transistors T1 and T2 and one capacitor Cst, but is not limited thereto. For example, each sub pixel may further include one or more transistors or further include one or more capacitors.

The storage capacitor Cst may be an external capacitor which is additionally designed at the outside of the first transistor T1, rather than a parasitic capacitor (for example, Cgs or Cgd) which is an internal capacitor formed between the first node N1 and the second node N2 of the first transistor T1.

Each of the first transistor T1 and the second transistor T2 may be an n-type transistor or a p-type transistor.

As described above, in the display panel DISP, circuit elements such as a light emitting diode ED, two or more transistors T1 and T2, and one or more capacitors Cst are disposed. The circuit element (for example, a light emitting diode ED) is vulnerable to moisture or oxygen from the outside. Therefore, an encapsulation unit ENCAP may be disposed in the display panel DISP to suppress the permeation of the moisture or oxygen from the outside into the circuit element (specifically, the light emitting diode ED).

The encapsulation unit ENCAP may be configured by one layer or by a plurality of layers, and is not limited thereto.

In the display apparatus according to the embodiment of the present disclosure, the touch panel TSP may be formed on the encapsulation unit ENCAP.

For example, in the display apparatus, a touch sensor structure such as a plurality of touch electrodes TE which forms a touch panel TSP may be disposed on the encapsulation unit ENCAP.

During the touch sensing, a touch driving signal TDS or a touch sensing signal may be applied to the touch electrode TE. Accordingly, during the touch sensing, a potential difference is formed between the touch electrode TE and the cathode electrode which are disposed with the encapsulation unit ENCAP therebetween so that unnecessary parasitic capacitance may be formed. The parasitic capacitance may degrade a touch sensitivity. Therefore, in order to lower the parasitic capacitance, a distance between the touch electrode TE and the cathode electrode may be greater than a predetermined value (for example, 1 μm or larger) in consideration of a panel thickness, a panel manufacturing process, and a display performance, but it is not limited thereto. For example, a thickness of the encapsulation unit ENCAP may be at least 1 μm, but is not limited thereto.

Figure 4:
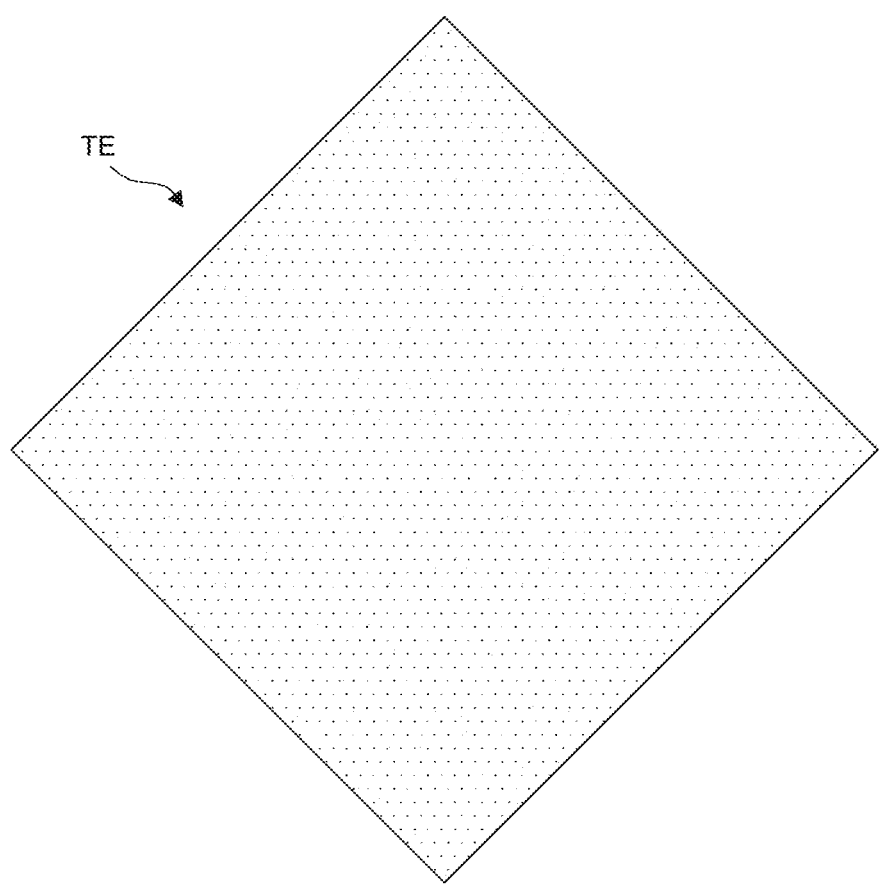
FIG. 4 illustrates a touch electrode disposed on a display panel according to an embodiment of the present disclosure.
Figure 5:
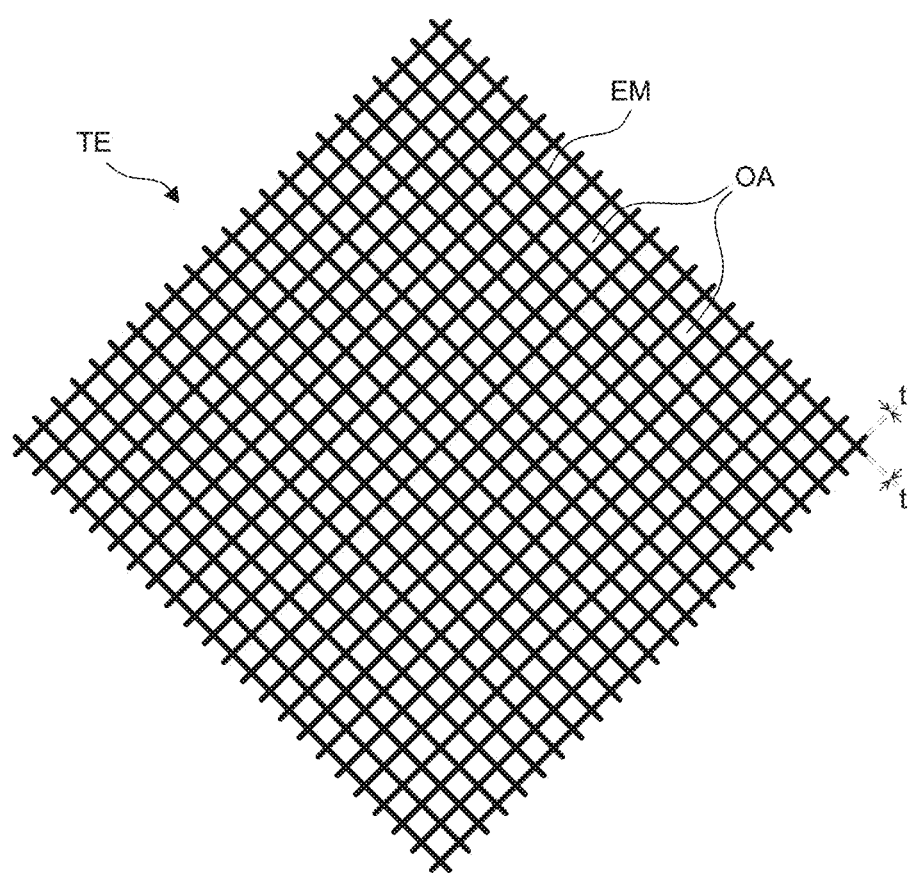
FIG. 5 illustrates a touch electrode disposed on a display panel according to an embodiment of the present disclosure.

FIGS. 4 and 5 illustrate a touch electrode disposed on a display panel according to an embodiment of the present disclosure.

As illustrated in FIG. 4, each touch electrode TE disposed in the display panel DISP may be a plate type electrode metal which does not have openings. In this case, each touch electrode TE may be a transparent electrode. For example, each touch electrode TE may be configured by a transparent electrode material so that light emitted from a plurality of sub pixels SP disposed there below is upwardly transmitted.

As another example, as illustrated in FIG. 5, each touch electrode TE disposed in the display panel DISP may be an electrode metal EM which is patterned in a mesh type to have two or more openings OA.

The electrode metal EM may be a part corresponding to a substantial touch electrode TE and may be a part to which the touch driving signal TDS is applied or a touch sensing signal is sensed.

As illustrated in FIG. 5, when each touch electrode TE is an electrode metal EM patterned in a mesh type, there may be two or more openings OA in an area of the touch electrode TE.

Each of two or more openings OA in each touch electrode TE may correspond to an emission area of one or more sub pixels SP. For example, the plurality of openings OA may serve as a path on which light emitted from the plurality of sub pixels SP disposed there below passes. In the following description, it will be described that each touch electrode TE is a mesh type electrode metal EM as an example.

The electrode metal EM corresponding to each touch electrode TE may be located on a bank which is disposed in an area other than the emission area of two or more sub pixels SP.

In order to form a plurality of touch electrodes TE, the electrode metal EM is broadly formed to be a mesh type and then the electrode metal is cut to have a predetermined pattern to electrically separate the electrode metals EM. Consequently, a plurality of touch electrodes TE may be formed.

With reference to FIG. 5, the mesh type electrode metal EM may have the same width (or thickness) t to obtain a uniform touch sensitivity. The width t of the electrode metal EM may be set by a material of the electrode metal, a distance between touch electrodes TE, or a height of the electrode metal, but is not limited thereto.

An outline shape of the touch electrode TE may be a square shape such as a diamond shape or a rhombus shape, but is not limited thereto. For example, the shape of the outline of the touch electrode TE may be various shapes such as a triangle, a pentagon, or a hexagon, but is not limited thereto.

Figure 6:
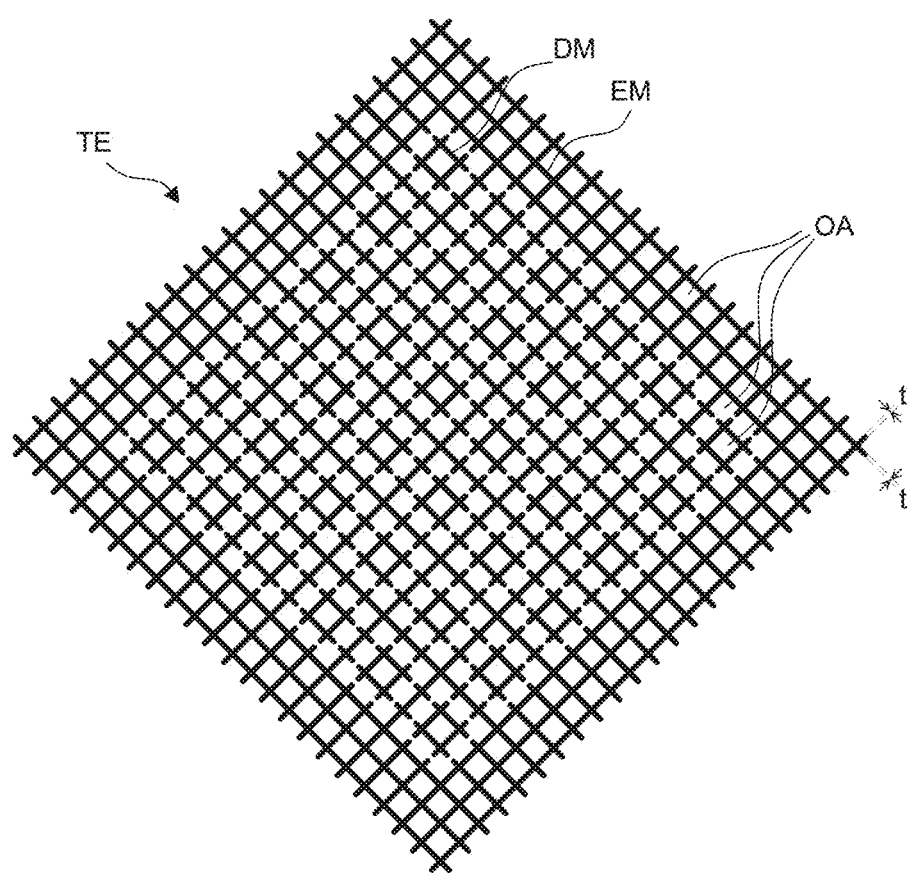
FIG. 6 illustrates a mesh-type touch electrode of FIG. 5 according to an embodiment of the present disclosure.

FIG. 6 illustrates a mesh-type touch electrode of FIG. 5 according to one embodiment.

With reference to FIG. 6, in an area of each touch electrode TE, the mesh type electrode metal EM and one or more dummy metals DM which are not connected or disconnected may be provided.

The electrode metal EM is a portion which corresponds to a substantial touch electrode TE so that a touch driving signal TDS is applied and a touch sensing signal is sensed thereby. However, even though the dummy metal DM is provided in the area of the touch electrode TE, the touch driving signal TDS is not applied and the touch sensing signal is not sensed. For example, the dummy metal DM may be an electrically floated metal. Accordingly, the electrode metal EM may be electrically connected to the touch driving circuit TDC, but the dummy metal DM is not electrically connected to the touch driving circuit TDC.

In the area of each touch electrode TE, one or more dummy metals DM may be provided not to be connected to the electrode metal EM or to be disconnected from the electrode metal EM.

As another example, only in the area of each of some touch electrodes TE among all touch electrodes TE, one or more dummy metals DM may be provided not to be connected to the electrode metal EM or to be disconnected from the electrode metal EM. That is, in an area of some touch electrodes TE, the dummy metal DM may not be disposed.

In the meantime, with regard to the role of the dummy metal DM, as illustrated in FIG. 5, when one or more dummy metals DM are not provided in the area of the touch electrode TE, but only the electrode metal EM is provided as a mesh type, there may be a visibility issue that an outline of the electrode metal EM is visible on a screen.

In contrast, as illustrated in FIG. 6, when one or more dummy metals DM are provided in the area of the touch electrode TE, the visibility issue that an outline of the electrode metal EM is visible on the screen may be suppressed.

For each touch electrode TE, the presence or the number of dummy metals DM (a ratio of dummy metals) is adjusted so that a magnitude of capacitance is adjusted for each touch electrode TE, to improve a touch sensitivity.

Some branches of the electrode metal EM formed in the area of one touch electrode TE are cut so that the cut electrode metal EM may be formed as a dummy metal DM. For example, the electrode metal EM and the dummy metal DM may be configured by the same material on the same layer.

With reference to FIG. 6, the mesh type electrode metal EM may have the same width (or thickness) t to obtain a uniform touch sensitivity. The width t of the electrode metal EM may be set by a material of the electrode metal, a distance between touch electrodes TE, a shape or a number of dummy metals DM, or a height of the electrode metal, but is not limited thereto.

The display apparatus according to the embodiment of the present disclosure may sense a touch based on capacitance formed in the touch electrode TE.

The display apparatus according to the embodiments of the present disclosure employs a capacitance based touch sensing manner so that the touch is sensed by a mutual-capacitance based touch sensing manner or a self-capacitance based touch sensing manner. The embodiment of the present disclosure is not limited thereto.

According to the mutual-capacitance based touch sensing manner, a plurality of touch electrodes TE may be classified into a driving touch electrode (a transmission touch electrode) to which a touch driving signal TDS is applied and a sensing touch electrode (a reception touch electrode) which detects a touch sensing signal and forms a capacitance with the driving touch electrode.

In the case of the mutual-capacitance based touch sensing manner, the touch sensing circuit TSC senses the presence of the touch and/or the touch coordinate based on the change in capacitance between the driving touch electrode and the sensing touch electrode (mutual-capacitance) depending on the presence of a pointer such as a finger or a pen.

According to the self-capacitance based touch sensing manner, each touch electrode TE may serve as both a driving touch electrode and a sensing touch electrode. For example, the touch sensing circuit TSC applies a touch driving signal TDS to one or more touch electrodes TE and detects a touch sensing signal by means of the touch electrode TE applied with the touch driving signal TDS. The touch sensing circuit TSC identifies the change in capacitance between a pointer such as a finger or a pen and the touch electrode TE based on the detected touch sensing signal to sense the presence of touch and/or the touch coordinate. In the self-capacitance based touch sensing manner, the driving touch electrode and the sensing touch electrode are not distinguished.

The display apparatus according to the embodiment of the present disclosure may sense the touch by the mutual-capacitance based touch sensing manner or the self-capacitance based touch sensing manner. Hereinafter, the display apparatus which performs the touch sensing based on the mutual-capacitance and has a touch sensor structure therefor will be described as an example.

Figure 7:
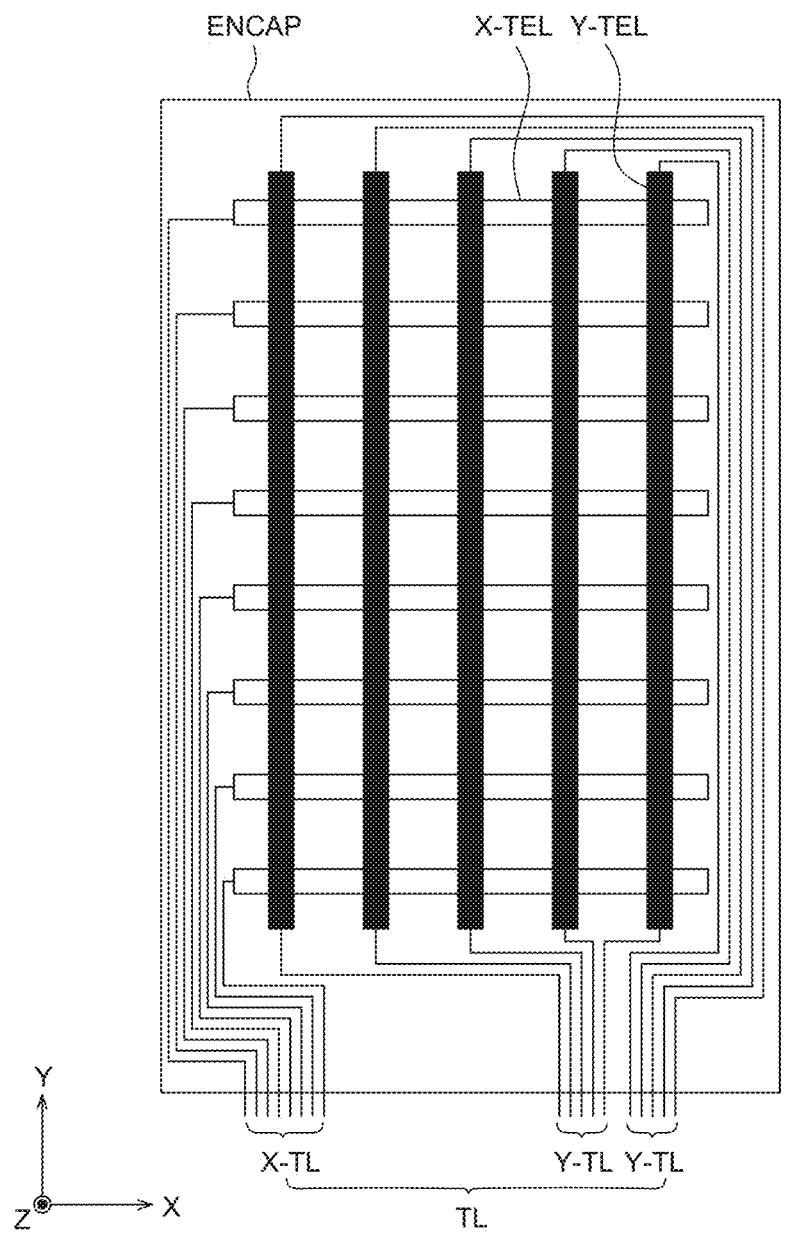
FIG. 7 illustrates a touch sensor structure in a touch panel according to embodiments of the present disclosure.

FIG. 7 illustrates a touch sensor structure in a touch panel according to embodiments of the present disclosure.

With reference to FIG. 7, a touch sensor structure for mutual-capacitance based touch sensing may include a plurality of X-touch electrode lines X-TEL and a plurality of Y-touch electrode lines Y-TEL. For example, the plurality of X-touch electrode lines X-TEL and the plurality of Y-touch electrode lines Y-TEL are located on the encapsulation unit ENCAP.

The plurality of X-touch electrode lines X-TEL may be disposed in a first direction and the plurality of Y-touch electrode lines Y-TEL is disposed in a second direction which is different from the first direction.

In the present disclosure, the first direction and the second direction are relatively different directions and for example, the first direction may be an x-axis direction and the second direction may be a y-axis direction. In contrast, the first direction may be a y-axis direction and the second direction may be an x-axis direction. Further, the first direction and the second direction may be perpendicular to each other, but may not be perpendicular. Further, in the present disclosure, a row and a column are relative so that the row and the column may be exchanged.

Each of the plurality of X-touch electrode lines X-TEL may be configured by a plurality of X-touch electrodes X-TE which are electrically connected. Each of the plurality of Y-touch electrode lines Y-TEL may be configured by a plurality of Y-touch electrodes Y-TE which are electrically connected. Here, the plurality of X-touch electrodes X-TE and the plurality of Y-touch electrodes Y-TE are included in the plurality of touch electrodes TE and have distinguished roles (functions).

For example, the plurality of X-touch electrodes X-TE which configures the plurality of X-touch electrode lines X-TEL may be driving touch electrodes and the plurality of Y-touch electrodes Y-TE which configures the plurality of Y-touch electrode lines Y-TEL may be sensing touch electrodes. For example, each of the plurality of X-touch electrode lines X-TEL corresponds to the driving touch electrode line and each of the plurality of Y-touch electrode lines Y-TEL corresponds to the sensing touch electrode line.

For example, the plurality of X-touch electrodes X-TE which configure the plurality of X-touch electrode lines X-TEL may be sensing touch electrodes and the plurality of Y-touch electrodes Y-TE which configure the plurality of Y-touch electrode lines Y-TEL may be driving touch electrodes. For example, each of the plurality of X-touch electrode lines X-TEL corresponds to the sensing touch electrode line and each of the plurality of Y-touch electrode lines Y-TEL corresponds to the driving touch electrode line.

The touch sensor metal for touch sensing may include a plurality of touch routing lines TL in addition to the plurality of X-touch electrode lines X-TEL and the plurality of Y-touch electrode lines Y-TEL.

The plurality of touch routing lines TL may include one or more X-touch routing lines X-TL connected to each of the plurality of X-touch electrode lines X-TEL and one or more Y-touch routing lines Y-TL connected to each of the plurality of Y-touch electrode lines Y-TEL.

Figure 8:
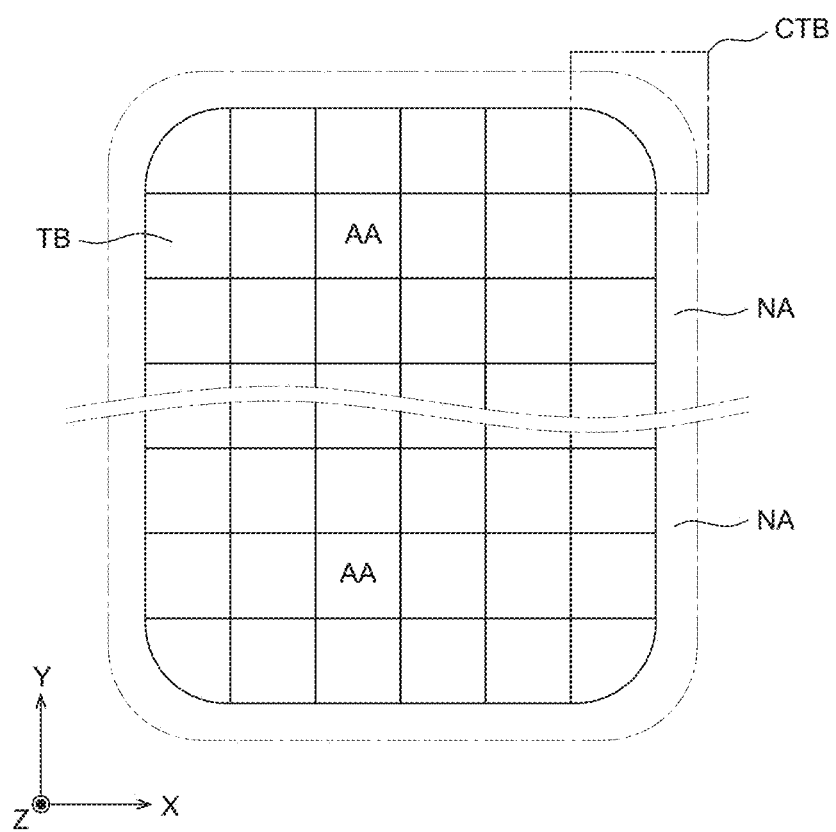
FIG. 8 is a plan view of a display apparatus according to an embodiment of the present disclosure.
Figure 9:
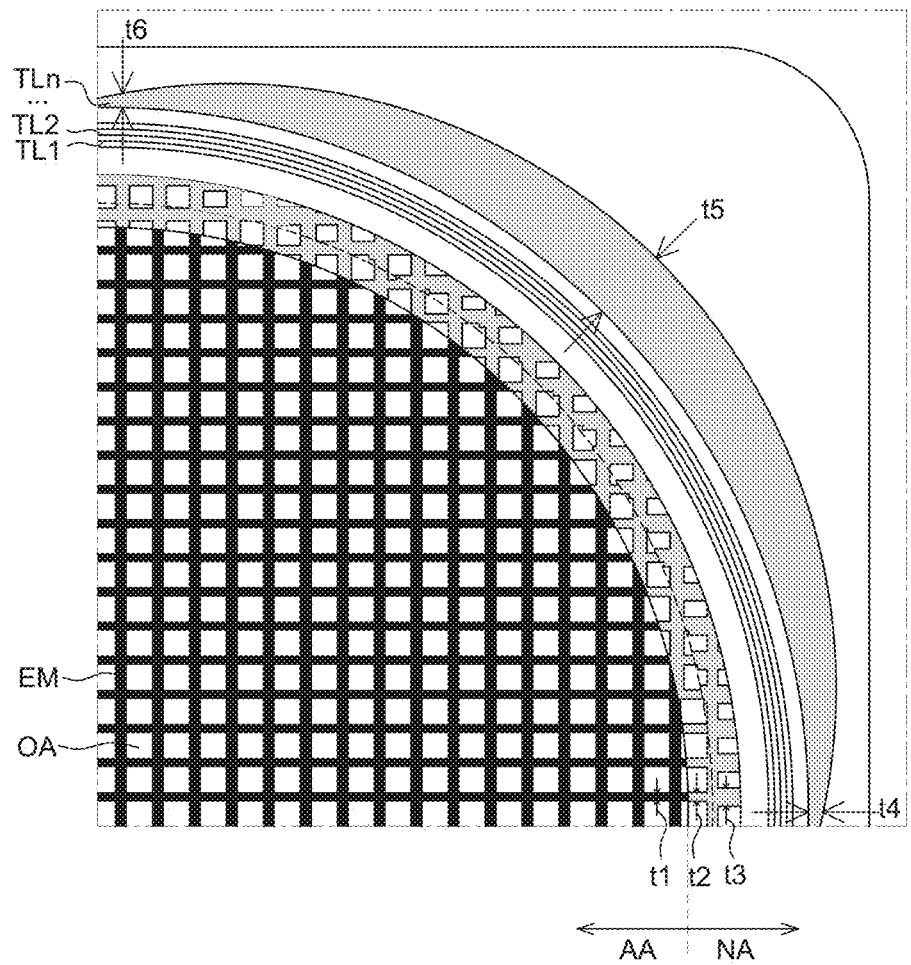
FIG. 9 is an enlarged view of a touch block of a corner portion of FIG. 8 according to an embodiment of the present disclosure.

FIG. 8 is a plan view of a display apparatus according to an embodiment of the present disclosure and FIG. 9 is an enlarged view of a touch block of a corner portion of FIG. 8 according to an embodiment of the present disclosure.

With reference to FIGS. 8 and 9, the display apparatus according to the embodiment of the present disclosure is configured with a display panel DISP including a display area (or active area) AA having a rounded square shape and a non-display area (or non-active area) surrounding the active area.

A plurality of touch electrodes X-TE and Y-TE in which the electrode metal EM is configured with a mesh shape may be disposed above the display panel DISP. The plurality of touch electrodes X-TE and Y-TE disposed above the display panel DISP are configured as one group to be partitioned by a touch block TB. For example, the touch block TB may be configured by one or more X-touch electrodes X-TE, one or more Y-touch electrodes Y-TE, and a touch electrode connection line connecting the touch electrodes.

The touch block TB disposed in the display area AA may have a square shape, but is not limited thereto. For example, in the display panel DISP according to the embodiment of the present disclosure, the display area AA has a rounded square shape so that a corner touch block CTB disposed at a corner of the display area AA may have a sector shape.

The touch electrode TE may be disposed to a part of the non-display area NA which surrounds the corner touch block CTB. For example, the touch electrode TE may be disposed so as to extend from the display area AA to an inner portion of the non-display area NA adjacent to the display area AA.

The touch electrode TE may be configured by a mesh type electrode metal EM and an opening OA. A width t of the electrode metal may have the same width (or thickness) t to obtain the uniform touch sensitivity in the touch block TB. The width t of the electrode metal EM may be set by a material of the electrode metal, a distance between touch electrodes TE, a shape or a number of dummy metals DM, a visibility level, or a height of the electrode metal, but is not limited thereto.

When the touch electrode TE is configured only by the mesh type electrode metal EM in the display area AA, there may be a visibility issue that the contour of the electrode metal EM is seen on the screen. When the dummy metal DM is formed by cutting a part of the mesh type electrode metal EM, the visibility issue that the contour of the electrode metal EM is seen on the screen may be reduced or suppressed.

The corner touch block CTB may be disposed in at least one of the corners of the display area AA. For example, the display area AA has four corners so that the number of corner touch blocks CTB may be 4, but is not limited thereto. A capacitance of the corner touch block CTB may be less than that of the other touch block TB. For example, the number of the plurality touch electrodes X-TE and Y-TE disposed in the corner touch block CTB may be less than the number of the plurality of touch electrodes X-TE and Y-TE disposed in the other touch block TB. By doing this, the capacitance of the corner touch block CTB may be less than that of the other touch block TB and the touch sensing performance may be reduced. Therefore, in order to improve the touch sensing performance, it may be configured as follows.

With reference to FIG. 9, the touch electrode TE of the corner touch block CTB may be disposed to a part of the inside of the non-display area NA. For example, the touch electrode TE may be disposed so as to extend from the display area AA to a part of the inside of the non-display area NA. The inside of the non-display area NA may be an area of the non-display area NA which is in contact with the display area AA and outside of the non-display area NA may be an area of the non-display area NA which becomes spaced apart from the display area AA, for example, an opposite area of an area which is in contact with the display area AA.

For example, the electrode metal EM may be disposed in the part of the inside of the non-display area NA of the corner touch block CTB. The capacitance of the touch electrode TE is directly proportional to the area of the touch electrode TE. The area of the touch electrode TE may be affected by the electrode metal EM. The electrode metal EM is disposed to the inside of the non-display area NA so that the capacitance of the corner touch block CTB is increased to improve the touch sensing performance.

The width of the electrode metal EM of the touch electrode TE disposed in the non-display area NA may be configured to be different from the width of the electrode metal EM of the touch electrode TE disposed in the display area AA. For example, the width of the electrode metal EM disposed in the non-display area NA may be configured to increase toward the outside of the non-display area NA. For example, the width of the electrode metal EM may be configured to increase by the same width in every predetermined section in the outward direction of the non-display area NA. The width of the electrode metal EM in the non-display area NA becomes large so that the capacitance of the corner touch block CTB is increased to further improve the touch sensing performance. The predetermined section may be a first section and a second section, but is not limited to the number of sections.

With reference to FIG. 9, when the width of the electrode metal EM in the display area AA is t1, a width of the electrode metal EM in the first area (or the first portion) of the non-display area NA is t2, a width of the electrode metal EM in the second area of the non-display area NA is t3, widths of the electrode metal EM in each area or every portion may have a relationship of t1≤t2≤t3. For example, the width of the electrode metal EM in each area or every portion may increase according to a step function.

A predetermined section at the outside of the non-display area or toward the outside may have a partial annular sector shape. For example, the sections share a center and are partitioned to have a shape in which partial annular sectors having a constant thickness are continuously disposed. For example, the outside touch block TB, rather than the corner touch block CTB, may have a square shape in a predetermined section toward the outside of the non-display area NA.

The touch electrode TE in the outermost section among the predetermined sections of the non-display area NA may not include an opening OA. For example, the width of the electrode metal EM of the touch electrode TE is increased so that the opening OA between electrode metals EM may be omitted. The width of the electrode metal EM in the non-display area NA is increased to the maximum so that the capacitance of the corner touch block CTB is increased to further improve the touch sensing performance.

A plurality of touch routing lines X-TL and Y-TL may be disposed at the outside of the touch electrode TE. Each of the plurality of touch routing lines X-TL and Y-TL may be electrically connected to the touch electrode TE. For example, the plurality of touch routing lines X-TL and Y-TL may apply a touch driving signal TDS to the touch electrode TE.

With reference to FIG. 9, the plurality of touch routing lines TL1, TL2, . . . . TLn (n is a natural number) are disposed at the outer periphery of the touch electrode TE of the corner touch block CTB. A width of some routing lines among the plurality of touch routing lines TL1 to TLn may not be uniform. For example, a width of the outermost touch routing line TLn among the plurality of touch routing lines TL1 to TLn may be the largest, but is not limited to the order, the position, and the number.

The plurality of touch routing lines TL1 to TLn is directly connected to the touch electrode TE to apply the touch driving signal TDS so that the plurality of touch routing lines may serve as extending touch electrodes TE. By doing this, the capacitance of the touch electrode TE of the corner touch block CTB is increased to maximize a touch sensing performance.

The corner touch block CTB may have a non-display area NA that is greater than those of the other touch block TB. For example, there may be a dead zone which is not utilized to dispose the components in the non-display area NA. The touch routing line with an enlarged width is disposed in the dead zone of the non-display area to increase the capacitance of the touch electrode TE. With reference to FIG. 9, when widths of both ends of the outermost touch routing line TLn are t4 and t6 and a width of the center is t5, the shape of the outermost touch routing line TLn may have a relationship of t4<t5<t6. For example, the touch routing line has a crescent shape, but is not limited thereto.

The display apparatus according to the embodiment of the present disclosure may be configured such that the width of the electrode metal EM of the touch electrode TE disposed in the non-display area NA of the corner touch block CTB is increased according to a predetermined rule. A width of some of the plurality of touch routing lines TL1 to TLn of the outer periphery of the touch electrode TE may be extended. By doing this, the capacitance of the touch electrode TE of the corner touch block CTB is increased to improve a touch sensing performance. The touch sensing performance of the touch electrode TE of the outer periphery of the display area of the display panel is improved so that a degree of freedom of the design of the shape of the outer periphery of the display area AA may be ensured.

The embodiments of the present disclosure can also be described as follows:

According to an embodiment of the present disclosure, a display apparatus includes a display panel including a display area and a non-display area surrounding the display area; a touch electrode on the display panel and including an electrode metal having a mesh shape; and a plurality of touch routing lines disposed at the outside of the touch electrode and electrically connected to the touch electrode, and the touch electrode is disposed in the display area and a part of the non-display area, and a width of the electrode metal of the touch electrode disposed in the non-display area is different from a width of the electrode metal of the touch electrode disposed in the display area.

According to some embodiments of the present disclosure, the width of the electrode metal of the touch electrode disposed in the non-display area may be increased toward the outside of the non-display area.

According to some embodiments of the present disclosure, the width of the electrode metal may be increased by the same width in every predetermined section of the non-display area.

According to some embodiments of the present disclosure, the predetermined section may have a square shape or a partial annular sector shape.

According to some embodiments of the present disclosure, widths of some of the plurality of touch routing lines may be different from each other.

According to some embodiments of the present disclosure, a width of an outermost touch routing line among the plurality of touch routing lines may be the largest.

According to some embodiments of the present disclosure, the outermost touch routing line may have a crescent shape.

According to another embodiment of the present disclosure, a display apparatus includes a display panel including a display area having a rounded square shape and a non-display area surrounding the display area; a touch electrode on the display panel and including an electrode metal having a mesh shape; and a plurality of touch routing lines disposed at the outside of the touch electrode and electrically connected to the touch electrode, and the touch electrode is disposed in the display area and a part of the non-display area, and a width of the outermost touch routing line among the plurality of touch routing lines is different from widths of the remaining of the plurality of touch routing lines.

According to some embodiments of the present disclosure, the width of the outermost touch routing line among the plurality of touch routing lines may be the largest.

According to some embodiments of the present disclosure, the outermost touch routing line may have a crescent shape.

According to some embodiments of the present disclosure, a width of the electrode metal of the touch electrode disposed in the non-display area surrounding a corner portion of the display area may be increased toward the outside of the non-display area.

According to some embodiments of the present disclosure, the width of the electrode metal of the touch electrode disposed in the non-display area surrounding the corner portion of the display area may be increased by the same width in every predetermined section of the non-display area.

According to some embodiments of the present disclosure, in the predetermined section, the touch electrode may be configured to have a shape in which a plurality of partial annular sectors whose radius is gradually increased is continuously disposed.

According to some embodiments of the present disclosure, some portion of the touch electrode may include an opening, and an outermost portion of the touch electrode may not include the opening.

It will be apparent to those skilled in the art that various modifications and variations can be made in the present disclosure without departing from the technical idea or scope of the disclosures. Thus, it is intended that the present disclosure covers the modifications and variations of this disclosure provided they come within the scope of the appended claims and their equivalents.

What is claimed is:
1. A display device, comprising:
a substrate including a display area and a non-display area surrounding the display area;
an encapsulation layer on the substrate;
a touch electrode on the encapsulation layer, the touch electrode having a mesh shape including a plurality of openings; and
a plurality of touch routing lines electrically connected to the touch electrode,
wherein a width of the plurality of touch routing lines that are electrically connected to the touch electrode in the non-display area is variable, and
wherein the touch electrode including the plurality of openings is disposed in the display area and extends into a portion of the non-display area.

2. The display device according to claim 1, wherein an area of an opening from the plurality of openings of the touch electrode in the non-display area is different from an area of an opening from the plurality of openings of the touch electrode in the display area.

3. The display device according to claim 2, wherein an area of the opening of the touch electrode in the non-display area is smaller than the area of the opening of the touch electrode in the display area.

4. The display device according to claim 1, wherein a width of an electrode metal of the touch electrode in the non-display area is different from a width of the electrode metal of the touch electrode in the display area.

5. The display device according to claim 1, wherein the plurality of touch routing lines are in an outermost portion of the non-display area where the touch electrode is not disposed.

6. The display device according to claim 5, wherein or a width of touch routing lines from the plurality of touch routing lines in the outermost portion of the non-display area is different from widths of remaining touch routing lines of the plurality of touch routing lines.

7. The display device according to claim 6, wherein a width of the touch routing lines in the outermost portion of the non-display area is a largest among the plurality of touch routing lines.

8. The display device according to claim 7, wherein the touch routing lines in the outermost portion of the non-display area has a crescent shape.

9. The display device according to claim 1, wherein the touch electrode includes a first touch electrode part in the display area and a second touch electrode part in the non-display area that extends from the first touch electrode part in the display area,
wherein a second opening of the second touch electrode part that is in the non-display area is non-overlapping with any one of a plurality of pixels and a first opening of the first touch electrode part that is in the display area overlaps a pixel from the plurality of pixels.

10. The display device according to claim 1, wherein a width of an electrode metal of the touch electrode in the non-display area is increased toward an outside of the non-display area.

11. The display device according to claim 10, wherein the width of the electrode metal of the touch electrode in the non-display area is gradually increased toward the outside of the non-display area.

12. The display device according to claim 10, wherein the width of the electrode metal is increased by a same width in every predetermined section of the non-display area.

13. The display device according to claim 12, wherein the predetermined section has a square shape or a partial annular sector shape.

14. The display device according to claim 10, wherein some branches of the electrode metal are cut and are a dummy metal.

15. The display device according to claim 1, wherein a number of touch electrodes in the non-display area per unit area is larger than a number of touch electrodes in the non-display area per unit area.

16. A display device, comprising:
a substrate including a display area and a non-display area surrounding the display area;
an encapsulation layer on the substrate;
a touch electrode on the encapsulation layer, the touch electrode having a mesh shape including a plurality of openings; and
a plurality of touch routing lines electrically connected to the touch electrode, wherein a width of an outermost touch routing line among the plurality of touch routing lines is different from widths of remaining touch routing lines of the plurality of touch routing lines, and wherein the touch electrode including the plurality of openings is disposed in the display area and extends into a portion of the non-display area.

17. The display device according to claim 16, wherein the width of the outermost touch routing line among the plurality of touch routing lines is a largest.

18. The display device according to claim 17, wherein the outermost touch routing line has a crescent shape.

19. The display device according to claim 16, wherein a width of an electrode metal of the touch electrode in the non-display area surrounding a corner portion of the display area is increased toward an outside of the non-display area.

20. The display device according to claim 19, wherein the width of the electrode metal of the touch electrode in the non-display area surrounding the corner portion of the display area is increased by a same width in every predetermined section of the non-display area.

21. The display device according to claim 20, wherein in the predetermined section, the touch electrode has a shape in which a plurality of partial annular sectors whose radius is gradually increased is continuously disposed.

22. The display device according to claim 20, wherein at least a portion of the touch electrode includes an opening, and an outermost portion of the touch electrode does not include the opening.

23. The display device according to claim 19, wherein a number of touch electrodes in a touch block in the corner portion of the display area is smaller than a number of touch electrodes in another touch block.

* * * * *